United States Patent
Zhou et al.

(10) Patent No.: US 9,119,219 B2
(45) Date of Patent: Aug. 25, 2015

(54) BANDWIDTH CONTROL METHOD, APPARATUS AND SYSTEM

(75) Inventors: Han Zhou, Shenzhen (CN); Wenfu Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 462 days.

(21) Appl. No.: 13/539,189

(22) Filed: Jun. 29, 2012

(65) Prior Publication Data

US 2012/0263083 A1 Oct. 18, 2012

Related U.S. Application Data

(63) Continuation of application No. PCT/CN2010/080616, filed on Dec. 31, 2010.

(30) Foreign Application Priority Data

Dec. 31, 2009 (CN) .......................... 2009 1 0217197

(51) Int. Cl.
| | | |
|---|---|---|
| *H04W 4/00* | (2009.01) | |
| *H04W 72/12* | (2009.01) | |
| *H04W 4/06* | (2009.01) | |
| *H04W 8/26* | (2009.01) | |
| *H04W 28/20* | (2009.01) | |
| *H04W 28/22* | (2009.01) | |
| *H04W 72/04* | (2009.01) | |
| *H04W 74/00* | (2009.01) | |

(52) U.S. Cl.
CPC .............. *H04W 72/121* (2013.01); *H04W 4/06* (2013.01); *H04W 8/26* (2013.01); *H04W 28/20* (2013.01); *H04W 28/22* (2013.01); *H04W 72/0453* (2013.01); *H04W 74/004* (2013.02)

(58) Field of Classification Search
USPC ................................... 370/329, 330, 331, 338
See application file for complete search history.

(56) References Cited

U.S. PATENT DOCUMENTS

| | | |
|---|---|---|
| 7,444,669 B1 | 10/2008 | Bahl et al. |
| 2006/0195576 A1* | 8/2006 | Rinne et al. .................. 709/226 |

(Continued)

FOREIGN PATENT DOCUMENTS

| | | |
|---|---|---|
| CN | 1859144 A | 11/2006 |
| CN | 1968197 A | 5/2007 |

(Continued)

OTHER PUBLICATIONS

Written Opinion of the International Searching Authority received in Application No. PCT/CN2010/080616 mailed Apr. 7, 2011, 4 pages.

(Continued)

*Primary Examiner* — Zewdu A Beyen
(74) *Attorney, Agent, or Firm* — Slater & Matsil, L.L.P.

(57) ABSTRACT

Embodiments of the present invention provide a bandwidth control method, apparatus, and system. The method includes: receiving an access request message sent by a user equipment; obtaining, according to the access request message, a group identity of a group to which the user equipment belongs and group-aggregate maximum bit rate parameter information of the group to which the user equipment belongs, so that a bandwidth control device performs bandwidth control on a user equipment in the group according to the group identity and the group-aggregate maximum bit rate parameter information.

14 Claims, 3 Drawing Sheets

(56) References Cited

U.S. PATENT DOCUMENTS

| | | | | |
|---|---|---|---|---|
| 2008/0069151 A1* | 3/2008 | Satoh et al. | | 370/503 |
| 2008/0172463 A1 | 7/2008 | Qin et al. | | |
| 2009/0225719 A1* | 9/2009 | Zhi et al. | | 370/329 |
| 2010/0110989 A1* | 5/2010 | Wu et al. | | 370/328 |

FOREIGN PATENT DOCUMENTS

| | | |
|---|---|---|
| CN | 1997007 A | 7/2007 |
| CN | 101001117 A | 7/2007 |
| CN | 101035139 A | 9/2007 |
| CN | 102118796 B | 4/2013 |
| EP | 1 173 023 A2 | 1/2002 |

OTHER PUBLICATIONS

International Search Report received in Application No. PCT/CN2010/080616 mailed Apr. 7, 2011, 5 pages.

First Office Action of Chinese Application No. 200910217197.3 mailed Jun. 4, 2012, 7 pages. (Partial Translation) 17.

* cited by examiner

BANDWIDTH CONTROL METHOD, APPARATUS AND SYSTEM

CROSS-REFERENCE TO RELATED APPLICATIONS

This application is a continuation of International Application No. PCT/CN2010/080616, filed on Dec. 31, 2010, which claims priority to Chinese Patent Application No. 200910217197.3, filed on Dec. 31, 2009, both of which are hereby incorporated by reference in their entireties.

FIELD OF THE INVENTION

Embodiments of the present invention relate to the field of communications technologies, and in particular, to a bandwidth control method, apparatus, and system.

BACKGROUND OF THE INVENTION

In a machine type communications (Machine Type Communications, referred to as MTC in short) application having a large number of user equipments (User Equipment, referred to as UE), a plurality of user equipments (equipment in the MTC application) may form a whole, which is referred to as a group or a user equipment group (Group), so that a network operator or a user in the industry may manage or control the group as a whole. The user equipments may form the group in different networking manner, for example, an independent access networking manner and a master/slave networking manner. In the independent access networking manner, each user equipment in the group separately accesses a network, and the network can associate all the user equipments in the group together (that is, form a group) for management and control. In the master/slave networking manner, the plurality of user equipments access the network through an access device, where the access device may be one of the user equipments, and may also be an MTC gateway (MTC GateWay, referred to as MTC GW). If the access device is one of the user equipments, the one of the user equipments is master equipment (Master UE), and other user equipments are slave equipment (Slave UE); if the access device is the MTC GW, the MTC GW is master equipment, and all the user equipments are slave equipment. The network may associate the master equipment and the slave equipment together (that is, form a group) for management and control. In the network, a bandwidth control device (a gateway or an access network element) may perform maximum bandwidth control according to an obtained aggregate maximum bit rate (Aggregate Maximum Bit Rate) of a user equipment.

During the process of implementing the present invention, the inventor finds that the prior art at least has the following problems: an existing bandwidth control device respectively obtains an aggregate maximum bit rate of each user equipment from a subscription database through a mobile management network element, and respectively performs maximum bandwidth control for each user equipment, thus increasing burdens of the bandwidth control device and the mobile management network element.

SUMMARY OF THE INVENTION

Embodiments of the present invention provide a bandwidth control method, apparatus, and system, which are used to reduce a burden on a bandwidth control device for allocating bandwidth resources.

An embodiment of the present invention provides a bandwidth control method, including:

receiving an access request message sent by a user equipment; and obtaining, according to the access request message, a group identity of a group to which the user equipment belongs and group-aggregate maximum bit rate parameter information of the group to which the user equipment belongs, so that a bandwidth control device performs bandwidth control on a user equipment in the group according to the group identity and the group-aggregate maximum bit rate parameter information.

An embodiment of the present invention provides another bandwidth control method, including:

receiving a group identity of a group to which a user equipment belongs, where the group identity of the group to which the user equipment belongs is sent by a mobile management network element;

obtaining group-aggregate maximum bit rate parameter information of the group to which the user equipment belongs; and performing bandwidth control on a user equipment in the group according to the group identity of the group to which the user equipment belongs and the obtained group-aggregate maximum bit rate parameter information of the group to which the user equipment belongs.

An embodiment of the present invention further provides a mobile management network element, including:

a first receiving module, configured to receive an access request message sent by a user equipment; and a first obtaining module, configured to obtain, according to the access request message, a group identity of a group to which the user equipment belongs and group-aggregate maximum bit rate parameter information of the group to which the user equipment belongs, so that a bandwidth control device performs bandwidth control on a user equipment in the group according to the group identity and the group-aggregate maximum bit rate parameter information.

An embodiment of the present invention further provides a bandwidth control device, including:

a second receiving module, configured to receive a group identity of a group to which a user equipment belongs, where the group identity of the group to which the user equipment belongs is sent by a mobile management network element;

a second obtaining module, configured to obtain group-aggregate maximum bit rate parameter information of the group to which the user equipment belongs; and a control module, configured to perform bandwidth control on a user equipment in the group according to the group identity of the group to which the user equipment belongs and the group-aggregate maximum bit rate parameter information of the group to which the user equipment belongs, where the group-aggregate maximum bit rate parameter information of the group to which the user equipment belongs is obtained by the second obtaining module.

An embodiment of the present invention further provides a bandwidth control system, including a mobile management network element and a bandwidth control device, where the mobile management network element is configured to receive an access request message sent by a user equipment, obtain, according to the access request message, a group identity of a group to which the user equipment belongs and group-aggregate maximum bit rate parameter information of the group to which the user equipment belongs, and send to the bandwidth control device the group identity of the group to which the user equipment belongs; and the bandwidth control device is configured to receive the group identity of the group to which the user equipment belongs, where the group identity of the group to which the user equipment belongs is sent by the mobile management network element, obtain the group-aggregate maximum bit rate parameter information of the group to which the user equipment belongs, and perform bandwidth control on a user equipment in the group according to the group identity of the group to which the user equipment belongs and the group-aggregate maximum bit rate parameter information of the group to which the user equipment belongs.

It can be known from the foregoing technical solutions that, the bandwidth control device of the embodiments of the present invention performs maximum bandwidth control on the user equipment in the group according to the obtained group-aggregate maximum bit rate parameter information of the group, thus implementing maximum bandwidth control of group granularity on user equipments in the group, enhancing control capability of an operator on the user equipments in the group, and reducing a burden on the bandwidth control device for allocating bandwidth resources.

BRIEF DESCRIPTION OF THE DRAWINGS

To illustrate the technical solutions according to the embodiments of the present invention or in the prior art more clearly, accompanying drawings required for describing the embodiments or the prior art are introduced briefly in the following. Apparently, the accompanying drawings in the following description are only some embodiments of the present invention, and persons of ordinary skill in the art may further obtain other drawings from the accompanying drawings without creative efforts.

DETAILED DESCRIPTION OF THE EMBODIMENTS

In order to make the objectives, technical solutions, and advantages of the embodiments of the present invention more clearly, the technical solutions according to the embodiments of the present invention are clearly and completely described in the following with reference to the accompanying drawings in the embodiments of the present invention. Apparently, the embodiments in the following description are merely part of rather than all of the embodiments of the present invention. All other embodiments obtained by persons of ordinary skill in the art based on the embodiments of the present invention without creative efforts shall fall within the protection scope of the present invention.

Figure 1:
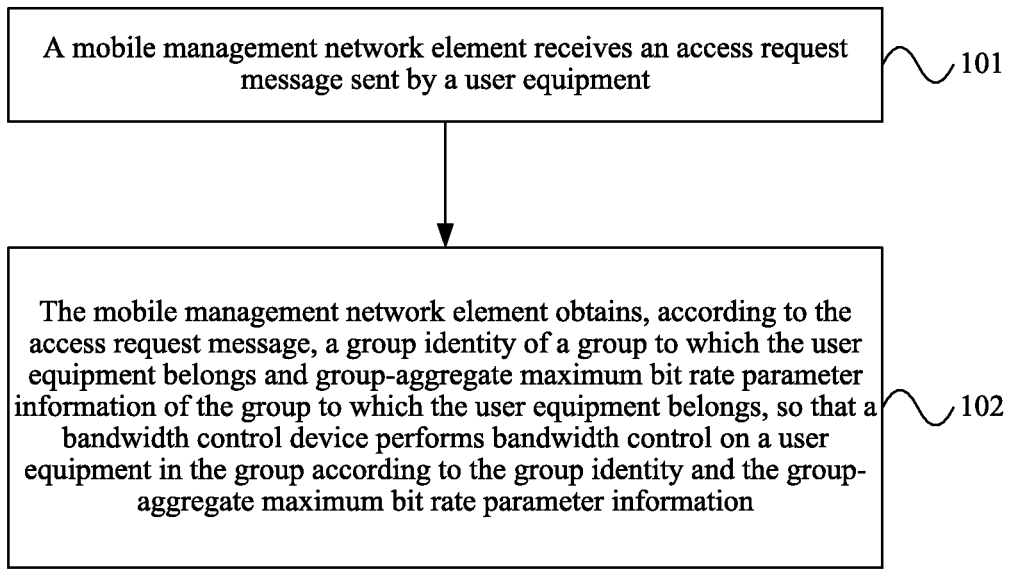
FIG. 1 is a schematic flowchart of a bandwidth control method according to a first embodiment of the present invention.

FIG. 1 is a schematic flowchart of a bandwidth control method according to a first embodiment of the present invention. As shown in FIG. 1, the bandwidth control method according to this embodiment may include the following steps:

Step 101: A mobile management network element receives an access request message sent by a user equipment.

Step 102: The mobile management network element obtains, according to the access request message, a group identity of a group to which the user equipment belongs and group-aggregate maximum bit rate parameter information of the group to which the user equipment belongs, so that a bandwidth control device performs bandwidth control on a user equipment in the group according to the group identity and the group-aggregate maximum bit rate parameter information.

The group identity is used to identify a group, where the group may be a user equipment group, a machine to machine (Machine To Machine, referred to as M2M) industry user (MTC User), an M2M application subscription user (MTC Subscriber or MTC Server), or another group formed by a plurality of devices, which is not limited in the embodiment of the present invention. The group identity may be an identity (Group ID) of a group to which the user equipment belongs, and may also be an identity shared by a plurality of user equipments in a group, for example, an international mobile subscriber identification number (International Mobile Subscriber Identification Number, referred to as IMSI), a mobile station international integrated services digital network number (Mobile Station International Integrated Services Digital Network Number, referred to as MSISDN), and an international mobile equipment identity (International Mobile Equipment Identity, referred to as IMEI); may also be a master equipment identity of master equipment in a group formed in a master/slave networking manner, for example, an IMSI, an MSISDN, an IMEI, a packet temporary mobile subscriber identity (Packet Temporary Mobile Subscriber Identity, referred to as P-TMSI), and a globally unique temporary identity (Globally Unique Temporary Identity, referred to as GUTI); and may also be another identity that may indicates a group, for example, an APN. The form of the group identity is not limited in the embodiment of the present invention.

The bandwidth control device may include a gateway and/or an access network element. If the bandwidth control device is a gateway, the group-aggregate maximum bit rate parameter information in this embodiment may be a group-access point name-aggregate maximum bit rate (Group-Access Point Name-Aggregate Maximum Bit Rate, referred to as Group-APN-AMBR) parameter or a group-aggregate maximum bit rate (Group-Aggregate Maximum Bit Rate, referred to as Group-AMBR) parameter. If the bandwidth control device is an access network element, the group-aggregate maximum bit rate parameter information in this embodiment may be a Group-AMBR parameter. If the bandwidth control device is a gateway and an access network element, the group-aggregate maximum bit rate parameter information on the gateway may be a Group-APN-AMBR parameter or a Group-AMBR parameter, and the group-aggregate maximum bit rate parameter information on the access network element may be a Group-AMBR parameter. It should be noted that, a name definition of the group-aggregate maximum bit rate parameter information is not limited in the embodiment of the present invention. Furthermore, if the user equipments form the group in a master/slave networking manner, the group-aggregate maximum bit rate parameter information may be aggregate maximum bit rate parameter information of master equipment in the group, for example, an APN-AMBR of the master equipment and/or a UE-AMBR of the master equipment.

In this embodiment, the mobile management network element may obtain, according to the access request message sent by the user equipment, the group identity of the group to which the user equipment belongs and the group-aggregate maximum bit rate parameter information of the group to which the user equipment belongs in the following methods:

1. If the access request message sent by the user equipment carries the group identity of the group to which the user equipment belongs, the mobile management network element may obtain the group identity of the group to which the user equipment belongs from the access request message, that is, the group to which the user equipment belongs is determined; furthermore, the mobile management network element may interact with a home subscription database according to the group identity of the group to which the user equipment belongs, obtain subscription data of the group to which the user equipment belongs, and obtain the group-aggregate maximum bit rate parameter information of the group to which the user equipment belongs from the subscription data. If user equipments in the group to which the user equipment belongs can share group subscription data, the mobile management network element may interact with the home subscription database according to the obtained group identity, acquire the group-aggregate maximum bit rate parameter information of the group, and the mobile management network element does not need to interact with the home subscription database for each user equipment in the group to obtain the group-aggregate maximum bit rate parameter information of the group.

2. If the access request message sent by the user equipment carries a user equipment identity of the user equipment, the mobile management network element may obtain subscription data of the user equipment or context information of the user equipment according to the user equipment identity, and obtain the group identity of the group to which the user equipment belongs and the group-aggregate maximum bit rate parameter information of the group to which the user equipment belongs from the subscription data or context information.

3. If the access request message sent by the user equipment carries a user equipment identity of the user equipment, the mobile management network element may obtain subscription data of the user equipment or context information of the user equipment according to the user equipment identity, obtain the group identity of the group to which the user equipment belongs from the subscription data or context information, obtain subscription data of the group to which the user equipment belongs according to the group identity of the group to which the user equipment belongs, and obtain the group-aggregate maximum bit rate parameter information of the group to which the user equipment belongs from the subscription data of the group to which the user equipment belongs.

The access request message in this embodiment may be an attach request (Attach Request) message, a routing area update request (Routing Area Update Request) message, a tracking area update request (Tracking Area Update Request) message, a service request (Service Request) message, a packet data network connectivity request (Packet Data Network Connectivity Request) message, or an activate packet data protocol context request (Activate Packet Data Protocol Context Request) message.

In this embodiment, the mobile management network element may send to the bandwidth control device the group identity of the group to which the user equipment belongs and the group-aggregate maximum bit rate parameter information of the group to which the user equipment belongs in the following methods:

1. If the user equipment that sends the access request message is a first user equipment, in the group, that accesses the bandwidth control device, the mobile management network element sends to the bandwidth control device the group identity of the group to which the user equipment belongs and the group-aggregate maximum bit rate parameter information of the group to which the user equipment belongs.

2. If the user equipment that sends the access request message is not a first user equipment, in the group, that accesses the bandwidth control device, because the bandwidth control device has already obtained the group-aggregate maximum bit rate parameter information of the group to which the user equipment belongs (for example, user equipment context of the group on the bandwidth control device has already included the group-aggregate maximum bit rate parameter information of the group to which the user equipment belongs), the mobile management network element may send to the bandwidth control device only the group identity of the group to which the user equipment belongs. Whether the mobile management network element sends to the bandwidth control device the group-aggregate maximum bit rate parameter information of the group to which the user equipment belongs in the foregoing scenario is not limited in the embodiment of the present invention.

In this embodiment, the bandwidth control device performs maximum bandwidth control on the user equipment in the group according to the obtained group-aggregate maximum bit rate parameter information of the group, thus implementing maximum bandwidth control of group granularity on the user equipments in the group, enhancing control capability of an operator on the user equipment in the group, and reducing a burden on the bandwidth control device for allocating bandwidth resources.

The bandwidth control method according to this embodiment may be applicable to a plurality of radio access networks, such as an evolved universal mobile telecommunication system (Universal Mobile Telecommunication System, referred to as UMTS) territorial radio access network (Evolved Universal Mobile Telecommunication System Territorial Radio Access Network, referred to as E-UTRAN), a UMTS territorial radio access network (UMTS Territorial Radio Access Network, referred to as UTRAN), a global system for mobile communications (Global System for Mobile Communications, referred to as GSM)/enhanced data rate for GSM evolution (Enhanced Data rate for GSM Evolution, referred to as EDGE) radio access network (GSM EDGE Radio Access Network, referred to as GERAN), and a non-3rd generation partner project (the 3rd Generation Partner Project, referred to as 3GPP) network.

The mobile management network element may be a mobility management network element (Mobility Management Entity, referred to as MME) in the E-UTRAN, may also be a serving general packet radio service (General Packet Radio Service, referred to as GPRS) supporting node (Serving GPRS Supporting Node, referred to as SGSN), and may also be an access gateway (Access Gateway, referred to as AGW) in the non-3GPP network, for example, may be a mobility management logic function in a evolved packet data gateway (Evolved Packet Data Gateway, referred to as ePDG) in a wireless local area network (Wireless Local Area Network, referred to as WLAN), may be an access service network gateway (Access Service Network Gateway, referred to as ASN GW) in a world interoperability for microwave access (World Interoperability for Microwave Access, referred to as WiMAX) network, or may be a mobility management logic function in a high rate packet data (High Rate Packet Data, referred to as HRPD) access network (Access Network, referred to as AN) in a code division multiple access (Code Division Multiple Access, referred to as CDMA) network.

The access network element may be an evolved NodeB (Evolved NodeB, referred to as eNB) in the E-UTRAN or a home evolved NodeB (Home Evolved NodeB, referred to as HeNB) in the E-UTRAN, may also be a radio network controller (Radio Network Controller, referred to as RNC) in the UTRAN/GERAN or a base station controller (Base Station Controller, referred to as BSC) in the UTRAN/GERAN, and may also be, in the non-3GPP network, an access network logic function in the ePDG in the WLAN, an access service network base station (Access Service Network Base Station, referred to as ASN BS) in the WiMAX network, or an access network logic function in the HRPD AN in the CDMA network.

The gateway may be a serving gateway (Serving Gateway, referred to as S-GW), may also be a packet data network gateway (Packet Data Network Gateway, referred to as P-GW), and may also be a gateway general packet radio service (General Packet Radio Service, referred to as GPRS) supporting node (Gateway GPRS Supporting Node, referred to as GGSN).

Figure 2:
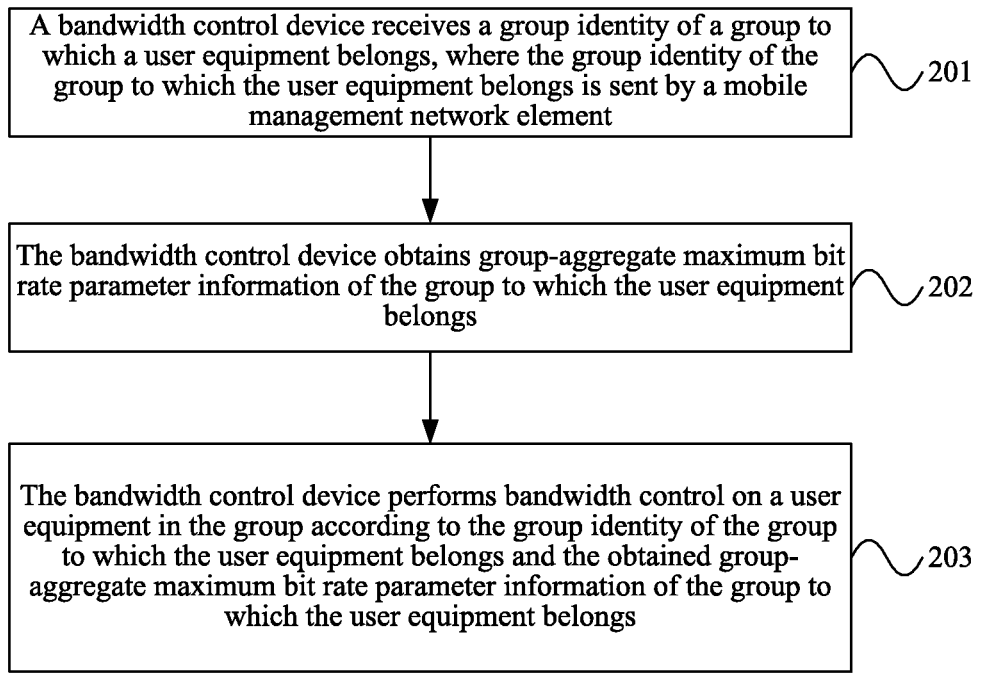
FIG. 2 is a schematic flowchart of another bandwidth control method according to a second embodiment of the present invention.

FIG. 2 is a schematic flowchart of another bandwidth control method according to a second embodiment of the present invention. As shown in FIG. 2, the bandwidth control method according to this embodiment may include the following steps:

Step 201: A bandwidth control device receives a group identity of a group to which a user equipment belongs, where the group identity of the group to which the user equipment belongs is sent by a mobile management network element.

Step 202: The bandwidth control device obtains group-aggregate maximum bit rate parameter information of the group to which the user equipment belongs.

Steps 203: The bandwidth control device performs bandwidth control on a user equipment in the group according to the group identity of the group to which the user equipment belongs and the obtained group-aggregate maximum bit rate parameter information of the group to which the user equipment belongs.

The group identity is used to identify a group, where the group may be a user equipment group, a machine to machine (Machine To Machine, referred to as M2M) industry user (MTC User), an M2M application subscription user (MTC Subscriber or MTC Server), or another group formed by a plurality of devices, which is not limited in the embodiment of the present invention. The group identity may be an identity (Group ID) of a group to which the user equipment belongs; and may also be an identity shared by a plurality of user equipments in a group, for example, an international mobile subscriber identification number (International Mobile Subscriber Identification Number, referred to as IMSI), a mobile station international integrated services digital network number (Mobile Station International Integrated Services Digital Network Number, referred to as MSISDN), and an international mobile equipment identity (International Mobile Equipment Identity, referred to as IMEI); may also be a master equipment identity of master equipment in a group formed in a master/slave networking manner, for example, an IMSI, an MSISDN, an IMEI, a packet temporary mobile subscriber identity (Packet Temporary Mobile Subscriber Identity, referred to as P-TMSI), and a globally unique temporary identity (Globally Unique Temporary Identity, referred to as GUTI); and may also be another identity that may indicates a group, for example, an APN. The form of the group identity is not limited in the embodiment of the present invention.

The bandwidth control device may include a gateway and/or an access network element. If the bandwidth control device is a gateway, the group-aggregate maximum bit rate parameter information in this embodiment may be a Group-APN-AMBR parameter or a Group-AMBR parameter. If the bandwidth control device is an access network element, the group-aggregate maximum bit rate parameter information in this embodiment may be a Group-AMBR parameter. If the bandwidth control device is a gateway and an access network element, the group-aggregate maximum bit rate parameter information on the gateway may be a Group-APN-AMBR parameter or a Group-AMBR parameter, and the group-aggregate maximum bit rate parameter information on the access network element may be a Group-AMBR parameter. It should be noted that, a name definition of the group-aggregate maximum bit rate parameter information is not limited in the embodiment of the present invention. Furthermore, if the user equipments form the group in a master/slave networking manner, the group-aggregate maximum bit rate parameter information may be aggregate maximum bit rate parameter information of master equipment in the group, for example, an APN-AMBR of the master equipment and/or a UE-AMBR of the master equipment.

In this embodiment, the bandwidth control device may obtain the group-aggregate maximum bit rate parameter information of the group to which the user equipment belongs in step 202 in the following methods:

1. If the user equipment is a first user equipment, in the group, that accesses the bandwidth control device, the mobile management network element sends to the bandwidth control device the group identity of the group to which the user equipment belongs and the group-aggregate maximum bit rate parameter information of the group to which the user equipment belongs, so that the bandwidth control device obtains the group-aggregate maximum bit rate parameter information.

2. If the user equipment is not a first user equipment, in the group, that accesses the bandwidth control device, it indicates that the bandwidth control device has already obtained the group-aggregate maximum bit rate parameter information of the group to which the user equipment belongs (for example, user equipment context of the group on the bandwidth control device has already included the group-aggregate maximum bit rate parameter information of the group to which the user equipment belongs), the mobile management network element does not need to send the group-aggregate maximum bit rate parameter information to the bandwidth control device again, and the bandwidth control device may obtain the group-aggregate maximum bit rate parameter information of the group to which the user equipment belongs from the user equipment context of the group. Whether the mobile management network element sends to the bandwidth control device the group-aggregate maximum bit rate information of the group to which the user equipment belongs in the foregoing scenario is not limited in the embodiment of the present invention.

Specifically, if the bandwidth control device is a gateway and the group-aggregate maximum bit rate parameter information is a Group-APN-AMBR parameter, when a user equipment that is not the first user equipment accessing the gateway accesses the gateway, the mobile management network element may judge whether an APN corresponding to an access request message initiated by the user equipment is consistent with an APN corresponding to an access request message initiated by the first user equipment accessing the gateway (for example, the mobile management network element may acquire, according to the access request message initiated by the user equipment, the group identity of the group to which the user equipment belongs, the mobile management network element acquires, according to the group identity, context information of the first user equipment, in the group, that accesses the gateway, and the mobile management network element compares whether the APN corresponding to the access request message initiated by the user equipment is consistent with the APN in the context information of the first user equipment accessing the gateway); if the APN corresponding to the access request message initiated by the user equipment is consistent with the APN corresponding to the access request message initiated by the first user equipment accessing the gateway, the mobile management network element may send to the gateway only the group identity of the group to which the user equipment belongs; otherwise, the mobile management network element sends to the gateway the group identity of the group to which the user equipment belongs and the Group-APN-AMBR parameter. The gateway performs bandwidth control on the user equipment in the group according to the received group identity of the group to which the user equipment belongs, where the received group identity of the group to which the user equipment belongs is sent by the mobile management network element, or according to the received group identity of the group to which the user equipment belongs, where the received group identity of the group to which the user equipment belongs is sent by the mobile management network element, and the Group-APN-AMBR parameter of the group to which the user equipment belongs, for example, limiting all non-guaranteed bit rate (Non-Guaranteed Bit Rate, referred to as Non-GBR) bearer bandwidths of user equipments in the group in the APN corresponding to the Group-APN-AMBR parameter to a value that does not exceed a value of the Group-APN-AMBR parameter, or limiting all bearer bandwidths of user equipments in the group in the APN corresponding to the Group-APN-AMBR parameter to a value that does not exceed a value of the Group-APN-AMBR parameter.

Specifically, if the bandwidth control device is a gateway and the group-aggregate maximum bit rate parameter information is a Group-AMBR parameter, when a user equipment that is not the first user equipment accessing the gateway accesses the gateway, the mobile management network element may send to the gateway only the group identity of the group to which the user equipment belongs. The gateway performs bandwidth control on the user equipment in the group according to the received group identity of the group to which the user equipment belongs, where the received group identity of the group to which the user equipment belongs is sent by the mobile management network element, for example, limiting all non-GBR bearer bandwidths of user equipments in the group to a value that does not exceed a value of the Group-AMBR parameter, or limiting all bearer bandwidths of user equipments in the group to a value that does not exceed a value of the Group-AMBR parameter.

Specifically, if the bandwidth control device is an access network element, the group-aggregate maximum bit rate parameter information is a Group-AMBR parameter. If a user equipment in the group is in a connection state with the access network element (context information of the user equipment in the group is stored in the access network element), when other user equipments in the group access the access network element, the mobile management network element may send to the gateway only the group identity of the group to which the user equipment belongs; if no user equipment in the group is in the connection state with the access network element (the context information of the user equipment in the group is not stored in the access network element), when the user equipments in the group access the access network element, the mobile management network element sends to the access network element the group identity of the group to which the user equipment belongs and the Group-AMBR parameter. The access network element performs bandwidth control on the user equipment in the group according to the received group identity of the group to which the user equipment belongs, where the received group identity of the group to which the user equipment belongs is sent by the mobile management network element, or according to the received group identity of the group to which the user equipment belongs, where the received group identity of the group to which the user equipment belongs is sent by the mobile management network element, and the Group-AMBR parameter of the group to which the user equipment belongs, for example, limiting all non-GBR bearer bandwidths of user equipments in the group to a value that does not exceed a value of the Group-AMBR parameter, or limiting all bearer bandwidths of user equipments in the group to a value that does not exceed a value of the Group-AMBR parameter.

In this embodiment, the bandwidth control device performs maximum bandwidth control on the user equipment in the group according to the obtained group-aggregate maximum bit rate parameter information of the group, thus implementing maximum bandwidth control of group granularity on the user equipments in the group, enhancing control capability of an operator on the user equipments in the group, and reducing a burden on the bandwidth control device for allocating bandwidth resources.

The bandwidth control method according to this embodiment may be applicable to a plurality of radio access networks, such as an evolved universal mobile telecommunication system (Universal Mobile Telecommunication System, referred to as UMTS) territorial radio access network (Evolved Universal Mobile Telecommunication System Territorial Radio Access Network, referred to as E-UTRAN), a UMTS territorial radio access network (UMTS Territorial Radio Access Network, referred to as UTRAN), a global system for mobile communications (Global System for Mobile Communications, referred to as GSM)/enhanced data rate for GSM evolution (Enhanced Data rate for GSM Evolution, referred to as EDGE) radio access network (GSM EDGE Radio Access Network, referred to as GERAN), and a non-3rd generation partner project (the 3rd Generation Partner Project, referred to as 3GPP) network.

The mobile management network element may be a mobility management network element (Mobility Management Entity, referred to as MME) in the E-UTRAN, may also be a serving general packet radio service (General Packet Radio Service, referred to as GPRS) supporting node (Serving GPRS Supporting Node, referred to as SGSN), and may also be an access gateway (Access Gateway, referred to as AGW) in the non-3GPP network, for example, may be a mobility management logic function in a evolved packet data gateway (Evolved Packet Data Gateway, referred to as ePDG) in a wireless local area network (Wireless Local Area Network, referred to as WLAN), may be an access service network gateway (Access Service Network Gateway, referred to as ASN GW) in a world interoperability for microwave access (World Interoperability for Microwave Access, referred to as WiMAX) network, or may be a mobility management logic function in a high rate packet data (High Rate Packet Data, referred to as HRPD) access network (Access Network, referred to as AN) in a code division multiple access (Code Division Multiple Access, referred to as CDMA) network.

The access network element may be an evolved NodeB (Evolved NodeB, referred to as eNB) in the E-UTRAN or a home evolved NodeB (Home Evolved NodeB, referred to as HeNB) in the E-UTRAN, may also be a radio network controller (Radio Network Controller, referred to as RNC) in the UTRAN/GERAN or a base station controller (Base Station Controller, referred to as BSC) in the UTRAN/GERAN, and may also be, in the non-3GPP network, an access network logic function in the ePDG in the WLAN, an access service network base station (Access Service Network Base Station, referred to as ASN BS) in the WiMAX network, or an access network logic function in the HRPD AN in the CDMA network.

The gateway may be a serving gateway (Serving Gateway, referred to as S-GW), may also be a packet data network gateway (Packet Data Network Gateway, referred to as P-GW), and may also be a gateway general packet radio service (General Packet Radio Service, referred to as GPRS) supporting node (Gateway GPRS Supporting Node, referred to as GGSN).

Figure 3:
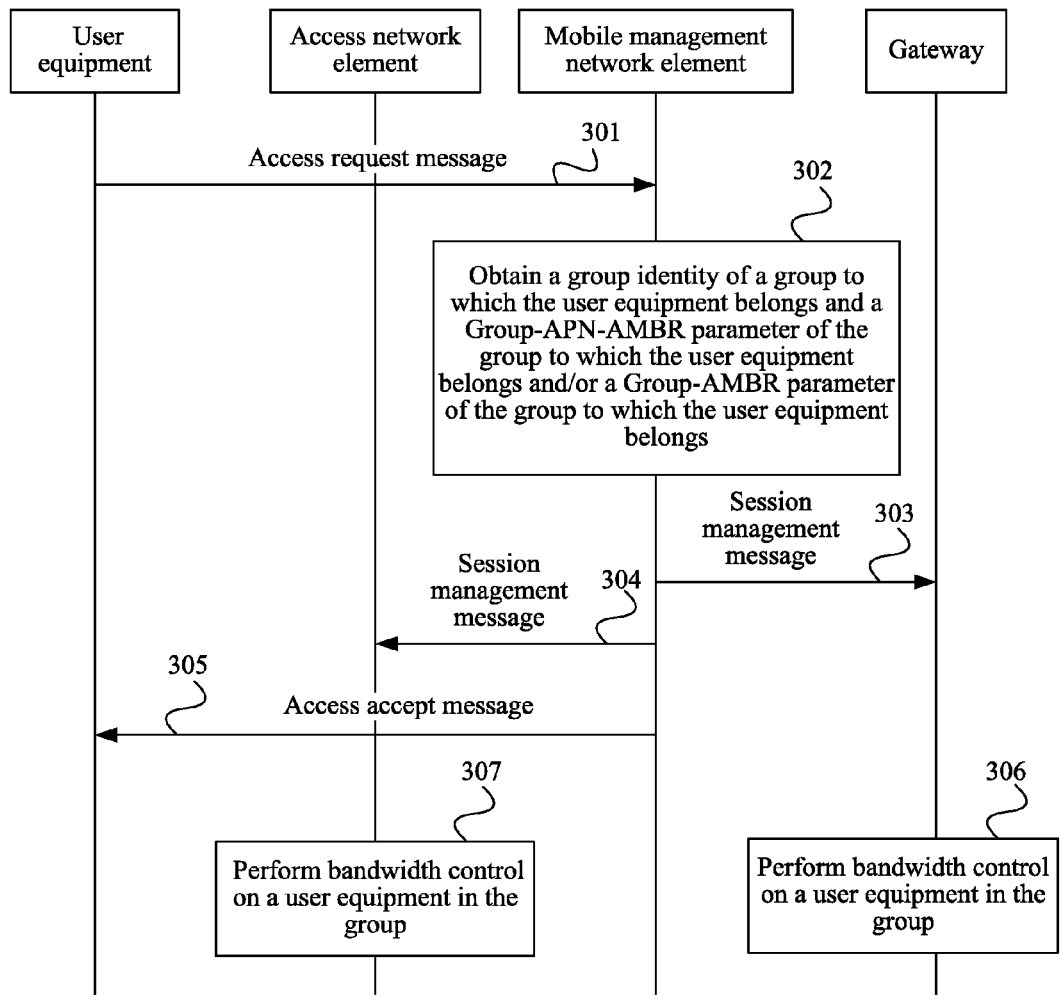
FIG. 3 is a schematic flowchart of a bandwidth processing method according to a third embodiment of the present invention.

FIG. 3 is a schematic flowchart of a bandwidth processing method according to a third embodiment of the present invention. As shown in FIG. 3, the bandwidth processing method according to this embodiment may include the following steps:

Step 301: A user equipment sends an access request message to a mobile management network element.

In this step, the access request message may carry a group identity of a group to which the user equipment belongs, and may also carry a user equipment identity of the user equipment. The access request message may be an attach request (Attach Request) message, a routing area update request (Routing Area Update Request) message, a tracking area update request (Tracking Area Update Request) message, a service request (Service Request) message, a packet data network connectivity request (Packet Data Network Connectivity Request) message, or an activate packet data protocol context request (Activate Packet Data Protocol Context Request) message.

Step 302: The mobile management network element receives the access request message sent by the user equipment, and obtains, according to the access request message, the group identity of the group to which the user equipment belongs and a Group-APN-AMBR parameter of the group to which the user equipment belongs and/or a Group-AMBR parameter of the group to which the user equipment belongs.

In this step, reference may be made to relevant description in the first embodiment of the present invention for a specific method for obtaining, by the mobile management network element and according to the access request message, the group identity of the group to which the user equipment belongs and the Group-APN-AMBR parameter of the group to which the user equipment belongs and/or the Group-AMBR parameter of the group to which the user equipment belongs, which is not repeatedly described here.

Step 303: If a bandwidth control device includes a gateway, the mobile management network element sends to the gateway the group identity of the group to which the user equipment belongs through a session management message.

Optionally, if the user equipment is a first user equipment, in the group, that accesses the gateway, the session management message in this step may further carry the Group-APN-AMBR parameter or the Group-AMBR parameter. The session management message may be a create session request (Create Session Request) message, a create PDP context request (Create PDP Context Request) message, or a modify bearer request (Modify Bearer Request) message.

Step 304: If the bandwidth control device includes an access network element, the mobile management network element sends to the access network element the group identity of the group to which the user equipment belongs through a session management message.

Optionally, if no user equipment in the group is in a connection state with the access network element (context information of the user equipment in the group is not stored in the access network element), the session management message in this step may further carry the Group-AMBR parameter. The session management message may be an initial context setup request (Initial Context Setup Request) message or a modify bearer request (Modify Bearer Request) message.

It should be noted that, step 303 and step 304 have an and/or relationship, that is:

only step 303 is performed, and step 304 is not performed; or only step 304 is performed, and step 303 is not performed; or both step 303 and step 304 are performed.

Step 305: The mobile management network element sends an access accept message to the user equipment.

The access accept message may be an attach accept (Attach Accept) message, a routing area update accept (RAU Accept) message, a tracking area update accept (TAU Request) message, a service accept (Service Accept) message, or an activate PDP context accept (Activate PDP Context Accept) message.

If the user equipments in the group form the group in a master/slave networking manner, the mobile management network element obtains, from the access request message, a master equipment identity as the group identity and a slave equipment identity of slave equipment that sends the access request message each time, so as to associate the slave equipment and the master equipment that belong to the same group. Specifically, the mobile management network element may obtain the master equipment identity and the slave equipment identity in the following methods:

1. The slave equipment may carry the slave equipment identity and the master equipment identity in an access request message, and send the access request message to the mobile management network element through the master equipment and the access network element.

2. The slave equipment may carry the slave equipment identity in an access request message, and send the access request message to the master equipment. The master equipment obtains the slave equipment identity, carries the master equipment identity and the obtained slave equipment identity in an access request message, and sends the access request message to the mobile management network element through the access network element.

3. The slave equipment may carry the slave equipment identity in an RRC layer of an access request message. The master equipment also carries the master equipment identity in the RRC layer when forwarding the access request message. After obtaining the master equipment identity and the slave equipment identity, the access network element sends the access request message carrying the master equipment identity and the slave equipment identity to the mobility management network element.

4. The slave equipment may carry the slave equipment identity in an access request message, and sends the access request message to the master equipment. The master equipment obtains the slave equipment identity, and also carries the master equipment identity in the RRC layer when forwarding the access request message. After obtaining the master equipment identity and the slave equipment identity, the access network element sends the access request message carrying the master equipment identity and the slave equipment identity to the mobility management network element.

Step 306: If the bandwidth control device includes the gateway, the gateway obtains the group identity of the group to which the user equipment belongs through the session management message, and performs bandwidth control on the user equipment in the group according to the group identity of the group to which the user equipment belongs and the obtained Group-APN-AMBR parameter of the group to which the user equipment belongs or Group-AMBR parameter of the group to which the user equipment belongs.

Specifically, reference may be made to relevant description in the second embodiment of the present invention for a specific method for obtaining, by the gateway, the Group-APN-AMBR parameter of the group to which the user equipment belongs or the Group-AMBR parameter of the group to which the user equipment belongs in this step, which is not repeatedly described here. Reference may be made to relevant description in the second embodiment of the present invention for a specific method for performing, by the gateway, the bandwidth control on the user equipment in the group in this step, which is not repeatedly described here.

Step 307: If the bandwidth control device includes the access network element, the access network element obtains the group identity of the group to which the user equipment belongs through the session management message, and performs bandwidth control on the user equipment in the group according to the group identity of the group to which the user equipment belongs and the obtained Group-AMBR parameter of the group to which the user equipment belongs.

Specifically, reference may be made to relevant description in the second embodiment of the present invention for a specific method for obtaining, by the access network element, the Group-AMBR parameter of the group to which the user equipment belongs in this step, which is not repeatedly described here. Reference may be made to relevant description in the second embodiment of the present invention for a specific method for performing, by the access network element, the bandwidth control on the user equipment in the group in this step, which is not repeatedly described here.

It should be noted that, step 306 and step 307 have an and/or relationship, that is:

only step 306 is performed, and step 307 is not performed; or only step 307 is performed, and step 306 is not performed; or both step 306 and step 307 are performed.

In this embodiment, the bandwidth control device performs maximum bandwidth control on the user equipment in the group according to the obtained group-aggregate maximum bit rate parameter information of the group, thus implementing maximum bandwidth control of group granularity on the user equipments in the group, enhancing control capability of an operator on the user equipments in the group, and reducing a burden on the bandwidth control device for allocating bandwidth resources.

It should be noted that, for ease of description, the foregoing method embodiments are all expressed as a combination of a series of actions, but persons skilled in the art should know that, the present invention is not limited to the described action sequence because, according to the present invention, some steps may be performed in other sequences or simultaneously. Next, persons skilled in the art should also know that, the embodiments described in the specification are all exemplary embodiments, and the related actions and modules are not necessarily required by the present invention.

In the foregoing embodiments, description for the embodiments has its own emphasis, and reference may be made to relevant description in other embodiments for a part that is not described in detail in a certain embodiment.

Figure 4:
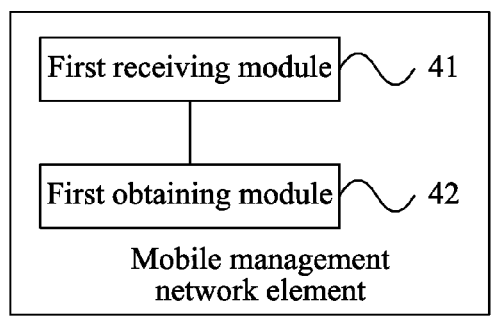
FIG. 4 is a schematic structural diagram of a mobile management network element according to a fourth embodiment of the present invention.

FIG. 4 is a schematic structural diagram of a mobile management network element according to a fourth embodiment of the present invention. As shown in FIG. 4, the mobile management network element according to this embodiment may include a first receiving module 41 and a first obtaining module 42. The first receiving module 41 receives an access request message sent by a user equipment. The first obtaining module 42 obtains, according to the access request message received by the first receiving module 41, a group identity of a group to which the user equipment belongs and group-aggregate maximum bit rate parameter information of the group to which the user equipment belongs, so that a bandwidth control device performs bandwidth control on a user equipment in the group according to the group identity and the group-aggregate maximum bit rate parameter information.

The method according to the first embodiment of the present invention and functions of the mobile management network element according to the third embodiment of the present invention may be implemented by the mobile management network element according to the embodiment of the present invention.

In this embodiment, reference may be made to relevant description in the first embodiment of the present invention for a method for sending the group identity of the group and the group-aggregate maximum bit rate parameter information of the group, where the group identity of the group and the group-aggregate maximum bit rate parameter information of the group are obtained by the first obtaining module, to the bandwidth control device, which is not repeatedly described here.

In this embodiment, the bandwidth control device performs maximum bandwidth control on the user equipment in the group according to the group-aggregate maximum bit rate parameter information of the group, where the group-aggregate maximum bit rate parameter information of the group is obtained by the first obtaining module, thus implementing maximum bandwidth control of group granularity on the user equipment in the group, enhancing control capability of an operator on the user equipment in the group, and reducing a burden on the bandwidth control device for allocating bandwidth resources.

Figure 5:
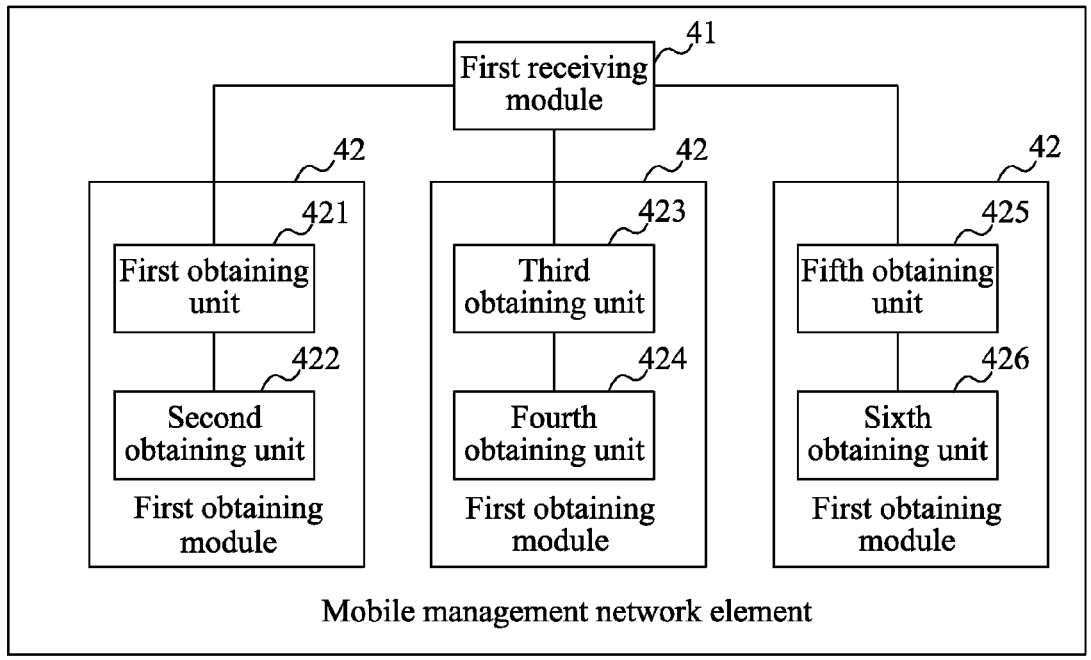
FIG. 5 is a schematic structural diagram of a mobile management network element according to a fifth embodiment of the present invention.

FIG. 5 is a schematic structural diagram of a mobile management network element according to a fifth embodiment of the present invention. As shown in FIG. 5, in comparison with the fourth embodiment, an access request message received by a first receiving module 41 in this embodiment carries a group identity of a group to which a user equipment belongs, and a first obtaining module 42 in this embodiment may further include a first obtaining unit 421 and a second obtaining unit 422. The first obtaining unit 421 obtains the group identity of the group to which the user equipment belongs from the access request message received by the first receiving module 41. The second obtaining unit 422 obtains, according to the group identity of the group to which the user equipment belongs, where the group identity of the group to which the user equipment belongs is obtained by the first obtaining unit 421, subscription data of the group to which the user equipment belongs, and obtains group-aggregate maximum bit rate parameter information of the group to which the user equipment belongs from the subscription data of the group to which the user equipment belongs.

Optionally, the access request message received by the first receiving module 41 in this embodiment carries a user equipment identity of the user equipment, and the first obtaining module 42 in this embodiment may further include a third obtaining unit 423 and a fourth obtaining unit 424. The third obtaining unit 423 obtains subscription data of the user equipment or context information of the user equipment according to the user equipment identity carried in the access request message received by the first receiving module 41. The fourth obtaining unit 424 obtains the group identity of the group to which the user equipment belongs and the group-aggregate maximum bit rate parameter information of the group to which the user equipment belongs from the subscription data obtained by the third obtaining unit 423 or the context information obtained by the third obtaining unit 423.

Optionally, the access request message received by the first receiving module 41 in this embodiment carries a user equipment identity of the user equipment, and the first obtaining module 42 in this embodiment may further include a fifth obtaining unit 425 and a sixth obtaining unit 426. The fifth obtaining unit 425 obtains the subscription data of the user equipment or context information of the user equipment according to the user equipment identity carried in the access request message received by the first receiving module 41, and obtains the group identity of the group to which the user equipment belongs from the subscription data or context information. The sixth obtaining unit 426 obtains, according to the group identity of the group to which the user equipment belongs, where the group identity of the group to which the user equipment belongs is obtained by the fifth obtaining unit 425, the subscription data of the group to which the user equipment belongs, and obtains the group-aggregate maximum bit rate parameter information of the group to which the user equipment belongs from the subscription data of the group to which the user equipment belongs.

Figure 6:
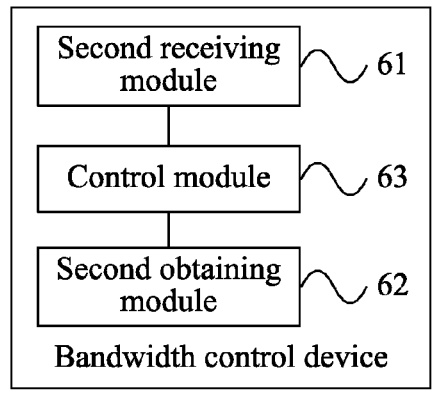
FIG. 6 is a schematic structural diagram of a bandwidth control device according to a sixth embodiment of the present invention.

FIG. 6 is a schematic structural diagram of a bandwidth control device according to a sixth embodiment of the present invention. As shown in FIG. 6, the bandwidth control device according to this embodiment may include a second receiving module 61, a second obtaining module 62, and a control module 63. The second receiving module 61 receives a group identity of a group to which a user equipment belongs, where the group identity of the group to which the user equipment belongs is sent by a mobile management network element. The second obtaining module 62 obtains group-aggregate maximum bit rate parameter information of the group to which the user equipment belongs. The control module 63 performs bandwidth control on a user equipment in the group according to the group identity of the group to which the user equipment belongs, where the group identity of the group to which the user equipment belongs is received by the second receiving module 61, and the group-aggregate maximum bit rate parameter information of the group to which the user equipment belongs, where the group-aggregate maximum bit rate parameter information of the group to which the user equipment belongs is obtained by the second obtaining module 62.

The method according to the second embodiment of the present invention and functions of the gateway and the access network element according to the third embodiment of the present invention may be implemented by the bandwidth control device according to the embodiment of the present invention.

In this embodiment, reference may be made to relevant description in the second embodiment of the present invention for a specific method for obtaining, by the second obtaining module 62, the group-aggregate maximum bit rate parameter information of the group to which the user equipment belongs, which is not repeatedly described here.

In this embodiment, the control module performs maximum bandwidth control on the user equipment in the group according to the group-aggregate maximum bit rate parameter information of the group, where the group-aggregate maximum bit rate parameter information of the group is obtained by the second obtaining module, thus implementing maximum bandwidth control of group granularity on the user equipments in the group, enhancing control capability of an operator on the user equipments in the group, and reducing a burden on the bandwidth control device for allocating bandwidth resources.

Figure 7:
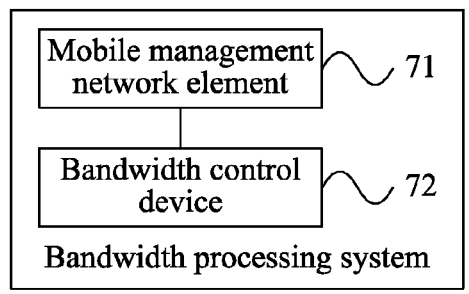
FIG. 7 is a schematic structural diagram of a bandwidth processing system according to a seventh embodiment of the present invention.

FIG. 7 is a schematic structural diagram of a bandwidth processing system according to a seventh embodiment of the present invention. As shown in FIG. 7, the bandwidth processing system according to this embodiment may include a mobile management network element 71 and a bandwidth control device 72.

The mobile management network element 71 is configured to receive an access request message sent by a user equipment, obtain, according to the access request message, a group identity of a group to which the user equipment belongs and group-aggregate maximum bit rate parameter information of the group to which the user equipment belongs, and send to the bandwidth control device 72 the group identity of the group to which the user equipment belongs.

The bandwidth control device 72 is configured to receive the group identity of the group to which the user equipment belongs, where the group identity of the group to which the user equipment belongs is sent by the mobile management network element 71, obtain the group-aggregate maximum bit rate parameter information of the group to which the user equipment belongs, and perform bandwidth control on a user equipment in the group according to the group identity of the group to which the user equipment belongs and the group-aggregate maximum bit rate parameter information of the group to which the user equipment belongs.

The method according to the first embodiment of the present invention and functions of the mobile management network element according to the third embodiment of the present invention may be implemented by the mobile management network element 71 in the bandwidth processing system according to the embodiment of the present invention. The method according to the second embodiment of the present invention and functions of the gateway and the access network element according to the third embodiment of the present invention may be implemented by the bandwidth control device 72 in the bandwidth processing system according to this embodiment of the present invention.

In this embodiment, reference may be made to relevant description in the second embodiment of the present invention for a specific method for obtaining, by the bandwidth control device 72, the group-aggregate maximum bit rate parameter information of the group to which the user equipment belongs, which is not repeatedly described here.

Furthermore, the mobile management network element 71 in the bandwidth processing system according to this embodiment may be further configured to send to the bandwidth control device 72 the group-aggregate maximum bit rate parameter information of the group to which the user equipment belongs. Accordingly, the bandwidth control device 72 may be further configured to obtain the group-aggregate maximum bit rate parameter information of the group to which the user equipment belongs, where the group-aggregate maximum bit rate parameter information of the group to which the user equipment belongs is sent by the mobile management network element 71, or obtain the group-aggregate maximum bit rate parameter information of the group to which the user equipment belongs in user equipment context of the group.

In this embodiment, the bandwidth control device performs maximum bandwidth control on the user equipment in the group according to the obtained group-aggregate maximum bit rate parameter information of the group, thus implementing maximum bandwidth control of group granularity on the user equipments in the group, enhancing control capability of an operator on the user equipments in the group, and reducing a burden on the bandwidth control device for allocating bandwidth resources.

Persons of ordinary skill in the art should understand that all or part of the steps of the foregoing method embodiments may be implemented by a program instructing relevant hardware. The program may be stored in a computer readable storage medium. When the program is executed, the steps of the foregoing method embodiments are performed. The storage medium may be any medium that is capable of storing program codes, such as a ROM, a RAM, a magnetic disk or an optical disk.

Finally, it should be noted that the foregoing embodiments are merely used to describe the technical solutions of the present invention, but not intended to limit the present invention. Although the present invention has been described in detail with reference to the foregoing embodiments, it should be understood by persons of ordinary skill in the art that: Modifications may still be made to the technical solutions described in the foregoing embodiments, or equivalent replacements may still be made to some technical features in the technical solutions; however, these modifications or replacements do not cause the essence of the corresponding technical solutions to depart from the spirit and scope of the present invention.

What is claimed is:

1. A bandwidth control method, comprising:
   receiving, at a mobility management entity, an access request message sent by a user equipment (UE) and that carries a user equipment identity of the user equipment; and
   obtaining subscription data of the user equipment or context information of the user equipment according to the user equipment identity;
   obtaining a group identity of the group to which the user equipment belongs from the subscription data or context information;
   obtaining, according to the group identity of the group to which the user equipment belongs, subscription data of the group to which the user equipment belongs; and
   obtaining group-aggregate maximum bit rate parameter information of the group to which the user equipment belongs from the subscription data of the group to which the user equipment belongs; and
   sending a session management message to a bandwidth control device separate from the mobility management entity, the session management message comprising at least the group identity of the group to which the user equipment belongs, so that the bandwidth control device performs bandwidth control on a user equipment in the group according to the group identity of the session management message and further according to the group-aggregate maximum bit rate parameter information;
   wherein the group to which the user equipment belongs is a group of UEs.

2. The method according to claim 1, wherein if the bandwidth control device comprises a gateway, the group-aggregate maximum bit rate parameter information is a Group-APN-AMBR parameter or a Group-AMBR parameter.

3. The method according to claim 2, wherein, if the group-aggregate maximum bit rate parameter information comprises the Group-APN-AMBR parameter, the bandwidth control device performs the bandwidth control by:
   limiting, by the bandwidth control device, all non-GBR bearer bandwidths of the UEs in the group in an APN corresponding to the Group-APN-AMBR parameter to a value that does not exceed a value of the Group-APN-AMBR parameter; or
   limiting, by the bandwidth control device, all bearer bandwidths of the UEs in the group in an APN corresponding to the Group-APN-AMBR parameter to a value that does not exceed a value of the Group-APN-AMBR parameter.

4. The method according to claim 2, wherein, if the group-aggregate maximum bit rate parameter information comprises the Group-AMBR parameter, the bandwidth control device performs the bandwidth control by:
   limiting, by the bandwidth control device, all non-GBR bearer bandwidths of the UEs in the group to a value that does not exceed a value of the Group-AMBR parameter; or
   limiting, by the bandwidth control device, all bearer bandwidths of the UEs in the group to a value that does not exceed a value of the Group-AMBR parameter.

5. The method according to claim 1, wherein if the bandwidth control device comprises an access network element, the group-aggregate maximum bit rate parameter information is a Group-AMBR parameter.

6. The method according to claim 1, wherein the UEs in the group form the group in a master/slave networking manner;
   wherein the group identity of the group to which the user equipment belongs comprises a master equipment identity; and
   wherein the group-aggregate maximum bit rate parameter information of the group to which the user equipment belongs comprises aggregate maximum bit rate parameter information of master equipment.

7. A bandwidth control method, comprising:
   receiving, at a system element, a group identity of a group to which a user equipment (UE) belongs, wherein the group identity of the group to which the user equipment belongs is determined from subscription data or context information that is obtained according to a user equipment identity, wherein the group identity of the group is sent by a mobile management network element in a session management message and wherein the group to which the user equipment belongs is a group of UEs;
   obtaining group-aggregate maximum bit rate parameter information of the group to which the user equipment belongs from the subscription data of the group to which the user equipment belongs; and
   performing bandwidth control, at the system element, on a user equipment in the group according to the group identity of the session management message and further according to the obtained group-aggregate maximum bit rate parameter information of the group to which the user equipment belongs.

8. The method according to claim 7, wherein the obtaining comprises obtaining the group-aggregate maximum bit rate parameter information of the group to which the user equipment belongs, wherein the group-aggregate maximum bit rate parameter information of the group to which the user equipment belongs is sent by the mobile management network element.

9. The method according to claim 7, wherein the obtaining comprises obtaining the group-aggregate maximum bit rate parameter information of the group to which the user equipment belongs in user equipment context of the group.

10. The method according to claim 7, wherein the group-aggregate maximum bit rate parameter information comprises a Group-APN-AMBR parameter or a Group-AMBR parameter.

11. The method according to claim 10, wherein, if the group-aggregate maximum bit rate parameter information comprises the Group-APN-AMBR parameter, performing the bandwidth control on the user equipment in the group comprises:
  limiting all non-GBR bearer bandwidths of the UEs in the group in an APN corresponding to the Group-APN-AMBR parameter to a value that does not exceed a value of the Group-APN-AMBR parameter; or
  limiting all bearer bandwidths of the UEs in the group in an APN corresponding to the Group-APN-AMBR parameter to a value that does not exceed a value of the Group-APN-AMBR parameter.

12. The method according to claim 10, wherein if the group-aggregate maximum bit rate parameter information comprises the Group-AMBR parameter, performing the bandwidth control on the user equipment in the group comprises:
  limiting all non-GBR bearer bandwidths of the UEs in the group to a value that does not exceed a value of the Group-AMBR parameter; or
  limiting all bearer bandwidths of the UEs in the group to a value that does not exceed a value of the Group-AMBR parameter.

13. A mobile management network element, comprising:
a processor;
a nontransitory computer readable medium in communication with the processor and having stored thereon instructions for causing the processor to:
  receive an access request message that carries a user equipment identity of the user equipment and that is sent by a user equipment; and
  obtain subscription data of the user equipment or context information of the user equipment according to the user equipment identity;
  obtain a group identity of the group to which the user equipment belongs from the subscription data or context information;
  obtain, according to the group identity of the group to which the user equipment belongs, subscription data of the group to which the user equipment belongs; and
  obtain group-aggregate maximum bit rate parameter information of the group to which the user equipment belongs from the subscription data of the group to which the user equipment belongs; and
  send a session management message to a bandwidth control device separate from the mobile management network element, the session management message comprising at least the group identity of the group to which the user equipment belongs, so that a bandwidth control device performs bandwidth control on a user equipment in the group according to the group identity of the session management message and further according to the group-aggregate maximum bit rate parameter information;
wherein the group to which the user equipment belongs is a group of UEs.

14. A bandwidth control device, comprising:
a processor;
a nontransitory computer readable medium in communication with the processor and having stored thereon instructions for causing the processor to:
  receive a group identity of a group to which a user equipment belongs from a mobile management network element separate from the bandwidth control device, wherein the group identity of the group to which the user equipment belongs is determined from subscription data or context information that is obtained according to a user equipment identity, wherein the group identity of the group and is sent by a mobile management network element and wherein the group to which the user equipment belongs is a group of UEs;
  obtain group-aggregate maximum bit rate parameter information of the group to which the user equipment belongs from the subscription data of the group to which the user equipment belongs; and
  perform bandwidth control on a user equipment in the group according to the group identity of the group to which the user equipment belongs and the group-aggregate maximum bit rate parameter information of the group to which the user equipment belongs.

* * * * *

UNITED STATES PATENT AND TRADEMARK OFFICE
CERTIFICATE OF CORRECTION

PATENT NO.        : 9,119,219 B2                                    Page 1 of 1
APPLICATION NO.   : 13/539189
DATED             : August 25, 2015
INVENTOR(S)       : Zhou It is certified that error appears in the above-identified patent and that said Letters Patent is hereby corrected as shown below:

In the claims
Col. 20, line 34, claim 14, delete "of the group and is sent by" and insert --of the group is sent by--.

Signed and Sealed this
Twelfth Day of January, 2016

Michelle K. Lee
*Director of the United States Patent and Trademark Office*